Feb. 3, 1959  D. GABOR  2,872,607
MAGNETIC ELECTRON LENSES
Filed Oct. 22, 1957

United States Patent Office 2,872,607
Patented Feb. 3, 1959

2,872,607

MAGNETIC ELECTRON LENSES

Dennis Gabor, London, England, assignor to National Research Development Corporation, London, England, a corporation of Great Britain Application October 22, 1957, Serial No. 691,660

Claims priority, application Great Britain October 25, 1956

9 Claims. (Cl. 313—77)

This invention relates to magnetic electron lenses for use in electron discharge devices. It is particularly concerned with so-called "strong focussing" lenses.

In the specifications of U. S. Patent No. 2,795,729 and in U. S. patent application Serial No. 355,765, now abandoned, and several other pending applications, there are described cathode ray tubes of a kind in which the electron beam is projected in a plane parallel to a screen and is deflected in this plane to provide the line scan of a raster to be drawn out on the screen. The frame scan of the raster is provided by a moving electric field which serves to deflect the end of the beam towards the screen at progressively varying distances across it. In such tubes, unless measures are taken to avoid it, there is a necessity for modulating the deflection forces which produce the line scan to correct the effect of trapezium distortion. This arises from the fact that as the frame scan proceeds, the beam is progressively shortened, and therefore needs to be deflected through a continuously increasing angle in order to generate the same length of line. The effect can, however, be avoided by passing the beam through a wide aperture lens of a convergent nature having a focus in the region of the effective deflection centre of the line deflection means so that the beam emerges from the lens at all times in a direction parallel to the lens axis, irrespective of the angle through which it has been deflected by the line deflection means. The lens is arranged in a tube of the kind disclosed in the above-mentioned Patent No. 2,795,429 along the margin of the picture area through which the beam enters said area. The lenses to be described in this specification are primarily for use in performing this function, although of course the invention is not limited to the lenses when so used. It should be mentioned that in addition to the advantage gained in tubes of the kind referred to above that trapezium distortion is automatically avoided, further advantages are obtained. One of these arises from the fact that the electrostatic field which performs the final deflection of the beam towards the screen will not operate quite the same upon beams entering this field at right angles to the line scan as it will upon those which enter the field at an oblique angle to this direction. The oblique beam will be deflected so as to hit the screen a little earlier than the perpendicular beam. It follows that if the beam were merely deflected over a fan shaped field, a slightly curved scan would be obtained on the screen. By using a lens of the kind to which this invention relates, the beam can be made to enter the final deflecting field at all times perpendicular to the direction of the line scan so that a straight line scan results. An important result of this is that in the production of colour television tubes employing a shadow mask as described in certain of the above-mentioned specifications a straight line structure can be provided for the shadow mask and the phosphor mosaic associated with it, and this considerably simplifies the production of such structures.

An object of the present invention therefore is to provide a magnetic electron lens having strong convergent properties over a wide aperture.

Another object of the invention is to provide a magnetic electron lens adapted to convert a divergent fan of electron beams into a parallel pattern for a wide angle of divergence.

According to the invention an electron lens comprises a magnetic assembly having front and rear flux carrying members defining between them an elongated aperture constituting a lens region through which an electron beam to be operated on by the lens may pass and means for energising said members in such a way that the leakage field set up across the aperture has a component spanning the gap which is substantially zero at the centre of the aperture and increases substantially linearly towards either end of the aperture.

One form of lens according to the invention comprises front and rear magnetic members defining an elongated aperture, one of said members being wound with an energising winding distributed uniformly along its length.

Another form of lens according to the invention comprises front and rear magnetic assemblies defining an elongated aperture between them, each comprising a pair of magnetic pole pieces arranged end to end along the corresponding margin of the aperture, said pole pieces being "magnetically tapered" (as herein defined) from their outer ends towards the centre, and means for supplying an energising flux to said pole pieces. The energising means may comprise magnetic yokes bridging the gaps between the outer ends of the front and rear assemblies, which yokes may be permanent magnets, electro-magnets or a combination of these.

As will be evident from the drawings and the following description, the term "elongated aperture" means that the space between the front and rear magnetic members or assemblies of the lens, through which the divergent fan of electron rays enters the lens, is long and narrow, i. e., slot-shaped in configuration.

The term "magnetically tapered" used above means that the pole pieces are so shaped, are so disposed relative to one another or are so energised that the magnetic leakage field across the aperture increases linearly from the centre of the aperture towards the ends.

The invention will be more clearly understood from the following description given with reference to the accompanying drawings in which.

Figure 1:
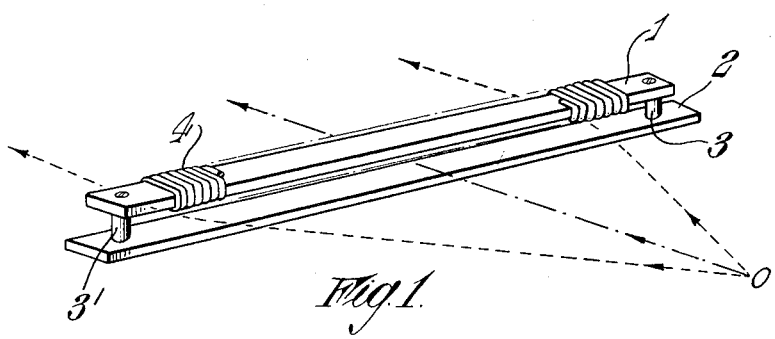
Fig. 1 is a perspective view of one kind of lens according to the invention.

Referring first to Fig. 1, it will be seen that the lens shown in this drawing comprises two bars 1 and 2 of magnetic material supported in spaced relation to one another and parallel to one another by two non-magnetic spacing members 3 and 3′, and defining between them an elongated lens aperture. Round the member 1 is wound a coil 4 through which the magnetising current is to be passed. The coil 4 is a uniform winding extending from end to end of the bar. The broken lines represent electron beams showing the operation of the lens when the coil 4 is energised with suitable direct current, the point O being the focal point of the lens and the central broken line through O depicting the lens axis. A fan of rays emanating from point O is brought into parallel relation on the far side of the lens. This action may be referred to as collimation, and in general the lenses according to this invention, particularly when they are used in connection with cathode ray tubes of the kind to which reference has been made above, will normally be regarded as collimator lenses.

Figure 2:
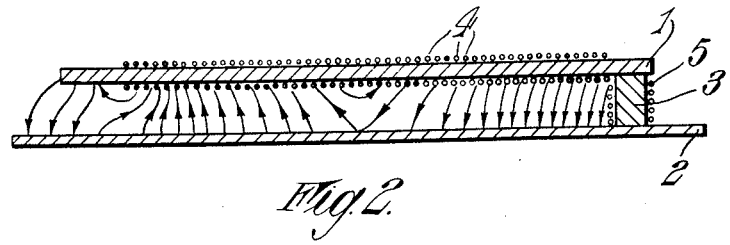
Fig. 2 is a cross sectional view of the lens of Fig. 1 slightly modified and showing the magnetic field set up therein.

Referring to Fig. 2, the arrows on this figure show the magnetic field distribution set up across the aperture of the lens, that is to say, across the space between bars 1 and 2. It will be seen that the vertical component of this field as seen in this figure, that is to say the field spanning the aperture falls to zero at the centre and increases linearly, in opposite sign, towards each end. At the left hand end there is shown the field distortion due to the termination of the coil 4. This may be corrected as shown at the right hand end where there is provided an additional coil 5 surrounding the (non-magnetic) support 3. It has been found that coil 5 requires about twice the number of ampere turns per unit length compared with the number of turns per unit length in coil 4 to make the lens usable over the full length of the aperture.

Figure 3:
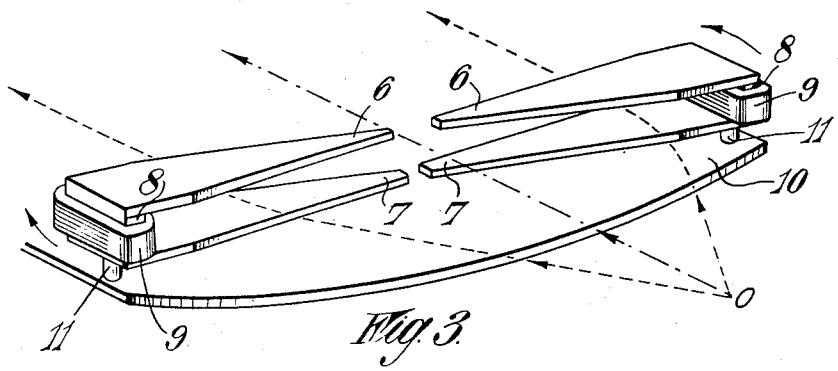
Fig. 3 is a perspective view of an alternative form of the lens according to the invention.

Referring now to Fig. 3, the lens shown in this figure will be seen to comprise two pairs of pole pieces 6, 6 and 7, 7 respectively forming what will be called the front and rear magnetic assemblies of the lens. The designations "front" and "rear" are identified with the location of the lens in a flat cathode ray tube of the kind referred to above, as will be seen more clearly in Fig. 4. The spaces between the front and rear assemblies are bridged at the outer ends by yokes 8, each carrying a coil 9 which serves to energise the assembly, and together constitute width towards the centre and a small gap is left between an elongated lens aperture. The pole pieces taper in width towards the centre and a small gap is left between the ends. The leakage field of this structure, it will be understood, resembles that of Fig. 2 so that the lens will provide the collimating action depicted by the broken line rays.

A magnetic screen 10 is shown in this embodiment supported behind the lens on spacing members 11. This acts to screen off the stray field of the lens structure from the region behind the lens and is necessary if the lens is used in a flat cathode ray tube as above proposed. The screen 10 is, of course, of soft ferro-magnetic material and terminates on the side from which the electron beam arrives, in a convex boundary. In order to compensate for the presence of this screen 10, it is found preferable to make the rear pole pieces 7 slightly less tapered than the front pole pieces 6 so as to be wider at their tips, and they are also made slightly longer so that the gap between them is less than that between pole pieces 6.

It has been found in some circumstances that the lens action is made more accurate if the pole pieces are made in the shape of spearheads, that is to say they bulge in width between the yoke end and the tip. The reason for this is that otherwise it is found that the deflecting effect increases more than linearly towards the ends so that distortion of the type known as cylindrical aberration would occur. By shaping the pole pieces as suggested substantially the whole aperture of the lens can be used. Indeed, by taking these precautions it was found possible to design a lens which would operate with a total aperture exceeding twice the focal length, that is to say, with a power which in conventional optical terminology is greater than f. 0.5.

The lenses according to the invention are convergent in the horizontal plane as shown in Fig. 3, but are divergent in a plane at right angles thereto, that is to say the vertical plane of Fig. 3 parallel to the axis of the lens.

Figure 4:
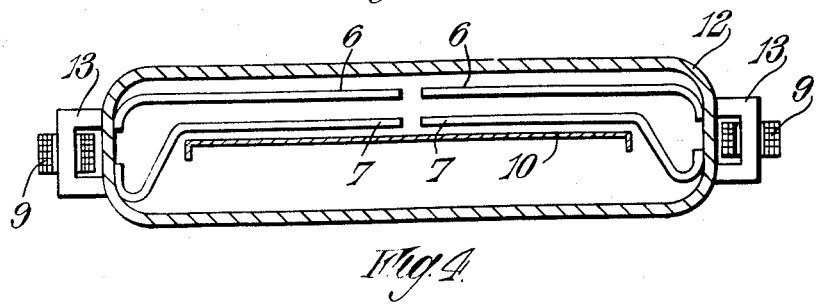
Fig. 4 is a sectional view of part of a cathode ray tube embodying a lens according to the invention.

Finally, referring to Fig. 4, this illustrates how the lens may be incorporated in a flat cathode ray tube of the kind referred to in the prior patent specification mentioned above. The drawing shows a cross section of the tube in a "horizontal" plane taken just below the picture area where the lens according to this invention will normally be located. Pole pieces 6 and 7 correspond to the pole pieces 6 and 7 of Fig. 3 but are somewhat differently shaped at their outer ends in order to lie closely adjacent the walls of the tube 12 outside which are placed magnetic yokes 13 which carry the energising coils 9. This arrangement enables a minimum of magnetic material to be included in the vacuum space and allows the yokes and coils associated with them to be accessible outside the tube for replacement and repair.

As will be understood, the yokes 13 could be made as permanent magnets and the coil 9 dispensed with, or they could of course be of soft magnetic material and the whole of the energising field produced by the coil 9. It is preferable, however, in accordance with known practice to design the yokes 13 so that their permanent magnetisation provides about one half the magnetising field required, leaving the other half to be supplied by the energising coils 9. This, as is known, reduces the dependence of the strength of the lens upon the voltage of the source from which the coils 9 are energised, which may be the same as the source serving to provide accelerating voltages for the electron beam.

It will be appreciated that the invention is capable to realization in a number of different forms and that the arrangements illustrated are to be regarded as by way of example only. For example, although the lenses described have been shown as symmetrical, that is to say, with a central axis, asymmetrical arrangements can be used if needed.

It is also possible as will be realised, to vary the gap between the front and rear structures to achieve the desired field distribution. Thus, in order to reduce the field at the centre of the lens it may be found desirable to bend the tips of the pole pieces 6 and 7 in an arrangement of the kind shown in Fig. 3 away from the central plane of the lens. Again, in order to reduce the divergent action of the lens in what has been called above the vertical plane of Fig. 3 the pole pieces in an arrangement of the kind shown in Fig. 3 may be made convergent in the direction of the lens axis (i. e. in the direction indicated by the broken lines in that figure) so as to avoid sudden transition into the influence of the lens.

I claim:

1. Electron lens comprising a magnetic assembly having front and rear magnetic flux carrying members supported in space, parallel relation and defining between them an elongated aperture constituting a lens region through which an electron beam to be operated on by the lens may pass, and means for so energising said members that the leakage field set up across the aperture has a component spanning the space between said members which is substantially zero at the centre of the aperture and increases substantially linearly towards either end of the aperture.

2. Electron lens as claimed in claim 1 wherein at least one of said magnetic members is wound with an energising winding distributed substantially uniformly along its length.

3. Electron lens having a lens axis and an elongated aperture and comprising a pair of magnetic members bounding the parts of said aperture lying on opposite sides of the lens axis, each of said magnetic members comprising front and rear arms extending towards said axis and defining said aperture between them, and means for magnetically energising said arms, the configuration of said members being arranged to provide a leakage field across said aperture which is substantially zero at the centre and increases substantially linearly towards either end of said aperture.

4. Electron lens having a lens axis and comprising a pair of U-shaped magnetic members each having a base portion and a pair of spaced arms, said members being disposed end to end with their open ends opposed so as to define between them an elongated aperture, and means for magnetically energising the arms of said magnetic members to provide a leakage field across said aperture having a component spanning the spaces between the arms of said magnetic members which is substantially zero at the centre of the assembly where the opposed arms of said members approach one another and increases substantially linearly towards the base portions of said U-shaped members at the outer ends of said aperture.

5. Electron lens as claimed in claim 4 comprising energising coils wound on yoke members constituting the base portions of said U-shaped members.

6. Electron lens as claimed in claim 5 wherein the arms of said U-shaped members taper from the base portions towards the centre of said aperture substantially to zero.

7. Electron lens as claimed in claim 6 wherein said arms terminate short of the centre of said aperture so as to leave gaps between the opposed ends of the arms of the two members.

8. Electron lens as claimed in claim 6 wherein the tips of the arms are splayed outwardly away from the lens axis.

9. Electron lens as claimed in claim 4 wherein the aperture defined by the magnetic members tapers in the direction of propagation through the lens.

References Cited in the file of this patent
UNITED STATES PATENTS

| | | |
|---|---|---|
| 2,182,382 | Hollman | Dec. 5, 1939 |
| 2,259,233 | Tingley | Oct. 14, 1941 |
| 2,742,589 | Goodrich | Apr. 17, 1956 |
| 2,752,520 | Morrell | June 26, 1956 |
| 2,763,804 | Morrell | Sept. 18, 1956 |
| 2,795,729 | Gabor | June 11, 1957 |
| 2,795,731 | Aiken | June 11, 1957 |

UNITED STATES PATENT OFFICE

CERTIFICATE OF CORRECTION

Patent No. 2,872,607                                                       February 3, 1959

Dennis Gabor

It is hereby certified that error appears in the printed specification of the above numbered patent requiring correction and that the said Letters Patent should read as corrected below.

Column 3, line 34, strike out "width towards the centre and a small gap is left between"; column 4, line 25, for "capable to" read -- capable of --.

Signed and sealed this 26th day of May 1959.

(SEAL)
Attest:

KARL H. AXLINE                                                              ROBERT C. WATSON
Attesting Officer                                                    Commissioner of Patents